July 6, 1943.    J. W. CHAMBERLAIN    2,323,308
REFRIGERATING APPARATUS
Filed Aug. 4, 1941    3 Sheets-Sheet 1

Inventor
Joseph W. Chamberlain
By Liverance and
Van Antwerp
Attorneys

July 6, 1943. J. W. CHAMBERLAIN 2,323,308
REFRIGERATING APPARATUS
Filed Aug. 4, 1941 3 Sheets-Sheet 2
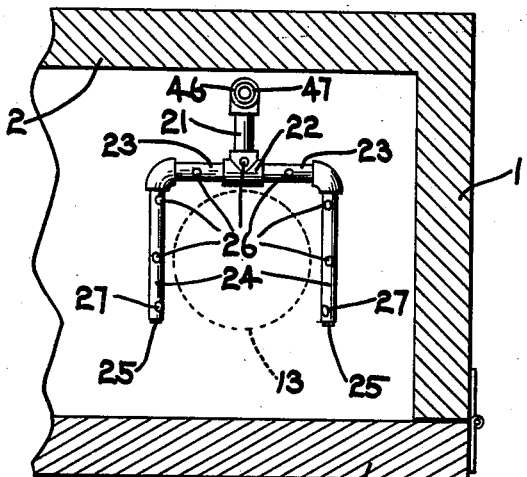
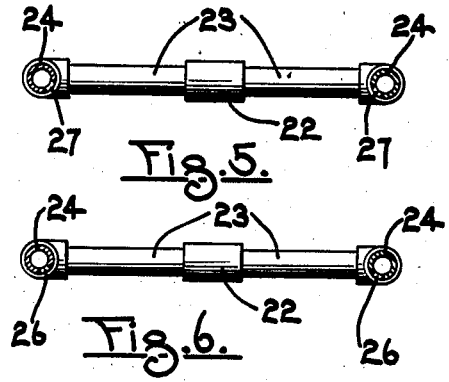
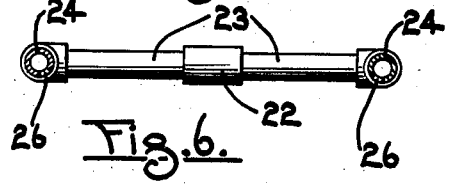
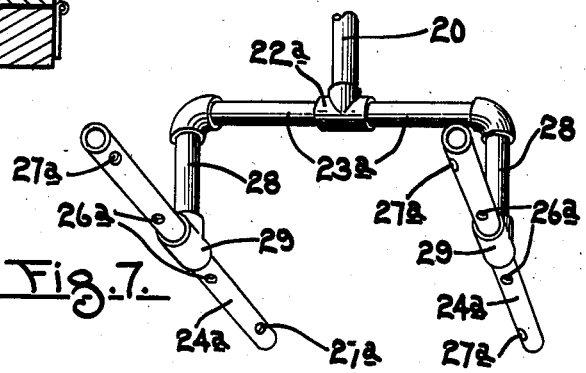
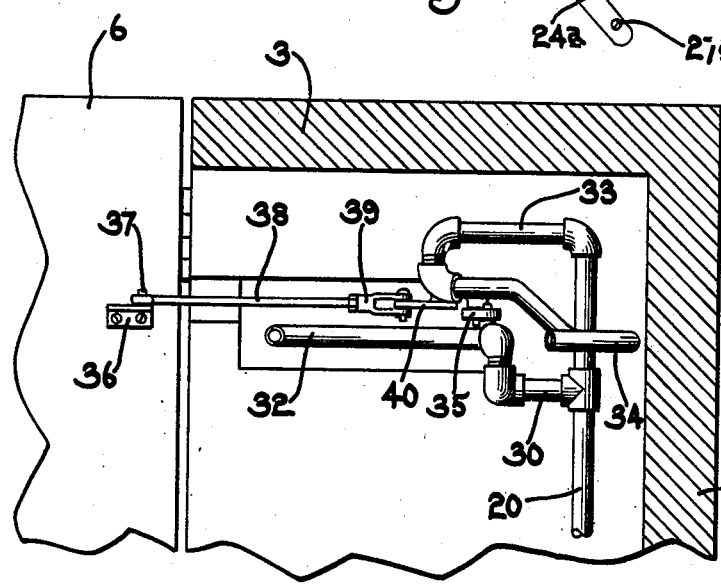
Inventor
Joseph W. Chamberlain
By Liverance and Van Antwerp
Attorneys July 6, 1943.  J. W. CHAMBERLAIN  2,323,308
REFRIGERATING APPARATUS
Filed Aug. 4, 1941  3 Sheets-Sheet 3
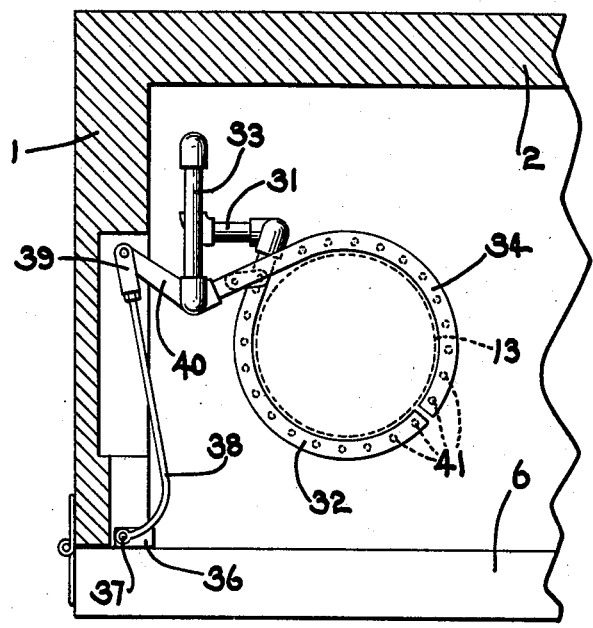
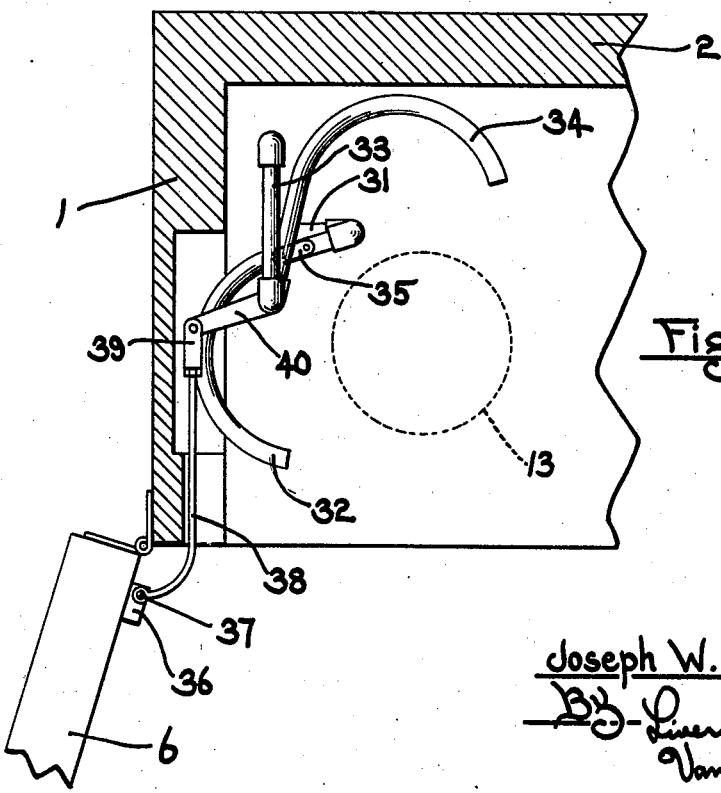
Inventor
Joseph W. Chamberlain
By Liverance and Van Antwerp
Attorneys Patented July 6, 1943

2,323,308

UNITED STATES PATENT OFFICE 2,323,308

REFRIGERATING APPARATUS

Joseph W. Chamberlain, Zeeland, Mich.

Application August 4, 1941, Serial No. 405,277

11 Claims. (Cl. 62—141)

This invention relates in general to a refrigerating apparatus which is especially designed to quickly and effectively cool milk or other fluid, and is more particularly directed to improved and novel mechanism for spraying a shower of cooling fluid, such as water, over and around a receptacle within which the milk is contained.

This application is a continuation in part of my previously filed copending application for refrigerator, Serial No. 324,573, filed March 18, 1940. The details of construction and operation of the refrigerator itself are adequately explained in said previously filed application. In general the structure consists of a cabinet which is open at its front side, which opening is adapted to be closed by doors, and in the bottom of the cabinet or otherwise located adjacent thereto is a plurality of serially connected chambers or cooling zones having a series of refrigerating coils therein to thereby provide a refrigerating compartment. A receptacle containing the milk or other fluid to be cooled is adapted to be located within the cabinet and has a conduit extending from the refrigerating compartment to the upper end of the receptacle where spray means is provided for showering the cooling fluid conducted from the refrigerating compartment over and around the receptacle. A pump is also located within the cabinet for forcing the cooling fluid through the conduits and through the spray means. After the cooling fluid has passed downwardly around the receptacle it is returned to one of the chambers in the refrigerating compartment where it passes over the coils therein through the successive cooling zones where it is again used by being passed through the conduits.

Suitable control bulbs are utilized, which are not disclosed in the present drawings, for controlling the motor and the flow of refrigerant through the coils. In said copending application it will be noted that refrigerating coils were indicated as being present in all of the chambers in the refrigerating compartment, whereas in the present case the coils have been omitted from the chamber wherein the cooling fluid is last present and from which it is passed over the receptacle. The reason for this is that in some cases it may be that the coils in the last chamber may become frozen solid with ice in which case there would not be enough cooling fluid present to take care of the capacity of the pump. One way of avoiding this would be to prevent the refrigerant from acting in the last chamber, but the most economical way would be as shown here where the coils in the last chamber are omitted entirely.

One of the objects of the present invention is to provide a number of novel and improved spray means whereby a film of the cooling fluid is formed completely about the receptacle and is passed downwardly thereover.

Another object of the invention is the provision of curved spray conduits which surround the receptacle in their operable position but may be either manually or mechanically moved and separated in a horizontal plane for the placement of a receptacle in the cabinet.

Still another object of the invention is the provision of valve means located between the inlet and outlet ends of the main conduit whereby the amount of cooling fluid and the pressure thereof passing through the spray means may be manually adjusted.

A still further object of the invention is the provision of means to by-pass some of the cooling fluid as it is forced through the main conduit so that it will pass over the refrigerating coils more often than it passes over the receptacle.

Other objects and purposes of the invention will appear more fully as the description proceeds.

To the accomplishment of the foregoing and related ends said invention, then, consists of the means hereinafter fully described and particularly pointed out in the claims.

The annexed drawings and following description set forth in detail certain means for carrying out my invention, said means constituting, however, but a few of various ways in which the principle of the invention may be employed.

In said annexed drawings wherein like reference numerals refer to like parts throughout the various views:

Fig. 4 is a fragmentary horizontal section through the cabinet showing one form of spray means in under plan view.

Fig. 5 is an enlarged vertical section through the openings at the outermost end of the spray means shown in Fig. 4.

Fig. 6 is a vertical section through the openings in the spray means at the innermost end thereof as shown in Fig. 4.

Fig. 7 is a perspective view of a modified form of spray means.

Fig. 8 is a fragmentary vertical section from front to rear through the cabinet showing in side elevation a still further form of spray means which is automatically opened and closed upon movement of the door.

Fig. 9 is a fragmentary horizontal section through the cabinet showing the spray means of Fig. 8 in plan view and in closed position.

Fig. 10 is a view similar to Fig. 9 but showing the spray means in open position.

Figure 1:
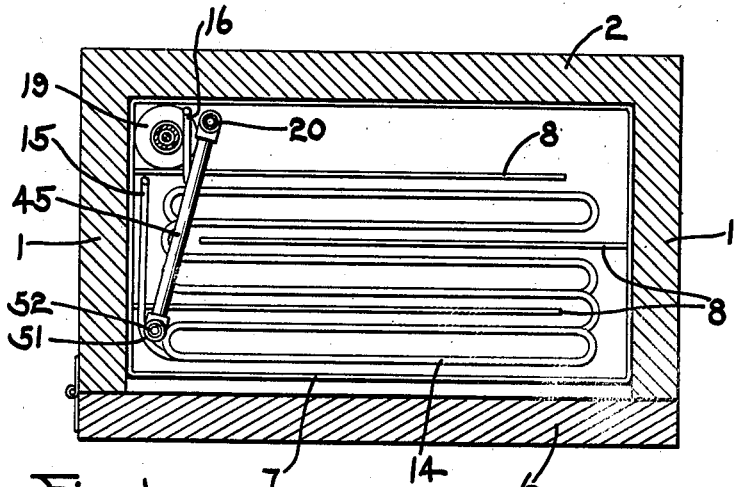
Fig. 1 is a horizontal section through the cabinet of the present invention.

Referring now more particularly to the drawings, it will be seen that the cabinet itself is heavily insulated and is provided with ends 1, a back 2, a top 3 and bottom 4. A front 5 extends from the bottom upwardly a short distance and is spaced from the top to provide an opening, which opening may be closed by movement of the door 6. It is immaterial whether one or more doors are used to close the cabinet, but for purposes of illustration only one has been shown.

Figure 2:
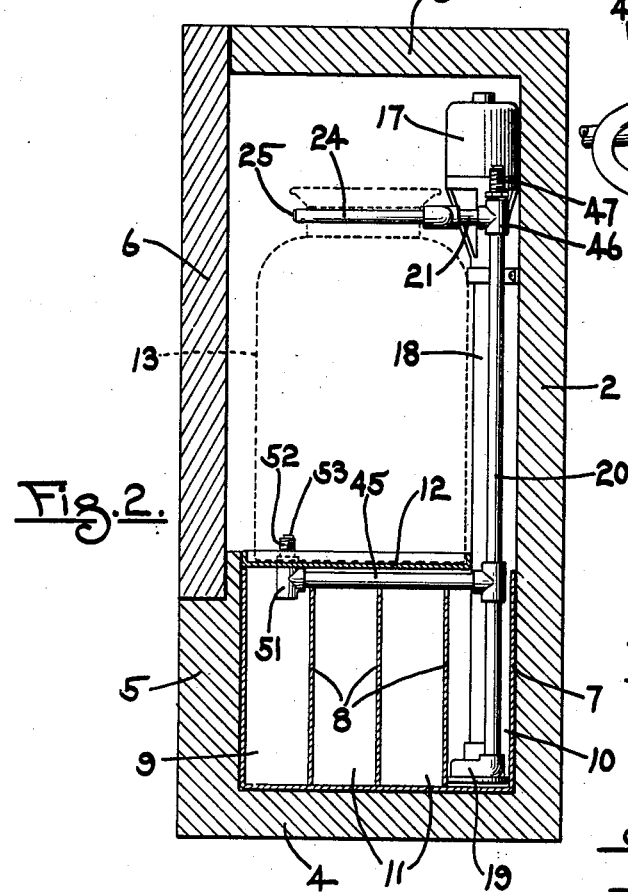
Fig. 2 is a vertical transverse section therethrough from front to rear.

The space at the bottom of the cabinet between the front portion 5 and the back and ends is utilized as a refrigerating compartment. A metallic liner 7 is located therein as shown in Figs. 1 and 2 which has extending longitudinally thereof a plurality of spaced apart baffles 8 to thereby provide several serially connected chambers or cooling zones. The chamber wherein the cooling fluid is initially returned after passing over the receptacle is indicated at 9, and the chamber at the opposite side of the compartment where the cooling fluid is last present and from which it is removed for passing over the receptacle is indicated at 10. The intermediate compartments are shown at 11. A cover plate 12, also preferably formed of metal, is placed over and above the baffles 8 and substantially encloses the refrigerating compartment. Openings may be provided along one side of the plate 12 so that the cooling fluid which has passed over the receptacle may thereby be returned to the chamber 9. While in the present case the chambers 9 and 10 have been shown as being at the front and rear of the compartment respectively, they may be reversed if desired without departing in any way from the spirit of the invention, as long as the fluid is returned to the chamber at one side of the compartment and is enabled to pass over the several refrigerating coils to the chamber at the opposite side of the compartment.

The plate 12 serves as a support for the milk receptacle 13 shown in dotted lines. Refrigerating coils 14 are formed in a continuous series and are present in each of the chambers excepting the one from which the cooling fluid is removed as shown in Fig. 1. Both ends of the coil are connected in the usual way with a compressor and the end 15 is the inlet, while the outlet end is shown at 16. A motor 17 which is located in the upper part of the cabinet has secured thereto an elongated shaft located within the protective sleeve 18 and which connects at its lower end with a centrifugal pump 19 located in the chamber where the cooling fluid is last present after having passed over the refrigerating coils in the several chambers. A main conduit 20 is connected at its lower end with the pump 19 and adjacent its upper end has a second conduit 21 connected therewith by means of the T connection 46. Another T 22 is secured to the outer end of the conduit 21 and has short pipes 23 extending outwardly from each end thereof for a short distance and to which are connected the pipes 24 extending at right angles thereto toward the front of the cabinet (Fig. 4). The outer ends of each pipe 24 are provided with a plug 25 and both the pipes 23 and 24 are provided at their undersides with a plurality of spaced apart openings 26. The outermost opening adjacent the ends of the pipes 24 are indicated at 27 and, unlike the other openings, are located at a substantial angle from the vertical inwardly toward the receptacle 13. While some or all of the openings 26 may be in a substantially vertical plane, it is essential for the efficient operation of the device that the end openings 27 be angularly disposed to insure a complete film of cooling fluid being formed around the receptacle. As will be seen, the pipes 24 extend one on each side of the receptacle and openings 26 substantially surround it so that cooling fluid being emitted therefrom will form a complete film, however, since no conduit is present at the front side of the receptacle, it is necessary to the formation of a complete film of fluid that such fluid be sprayed onto the receptacle at an angle and with sufficient force so that the film formed by the spray from these end openings will meet at the front of the receptacle. If there is any part of the receptacle which is not covered by the cooling fluid the efficiency will not be as great and the cooling will not take place as quickly. This form of the spray means has been found to work out satisfactorily in practice and is the most economical from the standpoint of manufacture.

In Fig. 7 a modified form of this type of spray device is shown wherein there is no connection between the pipes at each side of the receptacle at either end thereof. This type may be used where it is desirable to place the receptacle between the pipes at one end thereof and remove it from the other end. In this form of the device the main conduit 20 will extend upwardly higher than is shown in Fig. 2 and will continue forwardly and downwardly so that a T 22a may be connected at the lower end thereof from which conduits 23a will extend at either side thereof. At the outer ends of the conduit 23a other conduits 28 extend downwardly at substantially right angles thereto and have T's connected at their lower ends. The pipes 24a then are connected to the T's 29 so that they are substantially parallel and will be located one at each side of the receptacle. Openings 26a are located at the undersides of the pipes 24a, but in this case there will be four openings 27a, one at each end of each pipe, instead of two such openings shown in Fig. 4. Here again the openings 27a are disposed at a substantial angle from the vertical inwardly toward the receptacle, the reason for this being, as before to insure a film of cooling fluid being formed completely about the receptacle. It is to be seen in each case that the pressure of the fluid in the spray means is sufficient to permit the streams being directed from the openings 27a to meet.

In Figs. 8, 9 and 10, I have shown a form of spray device which is composed of two curved conduits which substantially surround the receptacle in their closed position and which are pivotally mounted to be opened for the placement and removal of the receptacle. In this form of the device I also provide means in connection with the door at the front of the cabinet so that the curved conduits will automatically open as the door is opened and will close upon the closing of the door. In this form of the invention a short conduit 30 extends forwardly at right angles to the main conduit 20 a distance below its upper end. Another short conduit 31 extends at right angles thereto and the curved conduit 32 is arranged so as to be pivotally connected thereto at one end. At the upper end of the main conduit 20 another conduit 33 extends forwardly toward the front of the cabinet at substantially right angles thereto and is curved downwardly at its forward end in such a manner that the other curved conduit 34 may be pivotally connected therewith. It is desirable that the two curved conduits be substantially in the same horizontal plane and so the rear end of the conduit 34 may necessarily extend angularly upwardly for a short distance as shown in Fig. 8 and from that point extend horizontally to its pivotal connection with the conduit 33. It is to be noted that the conduits 32 and 34 as shown are substantially semicircular, but the length of one or the other is immaterial so long as they completely surround the receptacle in their closed position. A short link 35 is connected at one end to the conduit 32 and at its other end to the conduit 34. Thus when one of the curved conduits is moved the other will be similarly moved through the connection of the link 35. In order that this movement may take place automatically upon opening or closing the door, a bracket 36 is secured to the inner side of the door 6 and in this particular instance has a pin 37 extending upwardly therefrom. A link 38 is then connected at its forward end to the pin 37 and at its rearward end threadedly engages a yoke 39, the connection between the yoke and the link being for adjustment purposes. An arm 40 is then pivotally connected at one end to the yoke 39 and is secured rigidly by means of welding or otherwise to the pivoted end of the curved conduit 34. It has been seen that a movement of the conduit 34 will likewise move the conduit 32 and so it will be evident that since any movement of the door 6 will be imparted through the link 38 and arm 40 to the conduit 34, the two conduits will separate as the door is opened and will move toward each other as the door is closed so that the two extreme positions of the conduits may be as shown in Figs. 9 and 10. The underside of each of these conduits is provided with a plurality of spaced apart openings 41 so that as the cooling fluid is forced through the main conduit 20, a part of it will pass through each of the curved conduits and outwardly through the openings 41 to thereby spray a shower of cooling fluid completely around the receptacle.

Figure 11:
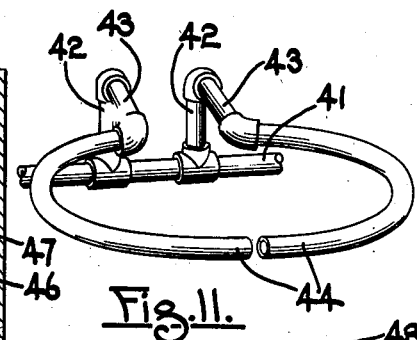
Fig. 11 is a perspective view of a still further modified form of spray means like that shown in the aforementioned previously filed application.

In Fig. 11 a further modification of spray ring is shown and is like that disclosed in my previously mentioned former application. In this type of structure a substantially horizontal conduit 41 is suitably connected with the main conduit 20 and is provided with two spaced apart upwardly extending short conduits 42 which, in turn, have the forwardly extending conduits 43 pivotally connected therewith and which terminate in the curved conduits 44. The underside of this spray ring is also provided with a plurality of openings and is similar in operation to the device shown in Figs. 8 to 10, the connection between the conduits 42 and 41 being of a pivotal nature, except that the device in Fig. 11 must be manually operated to separate and spread apart the curved conduits for the insertion and removal of the receptacle.

Spaced upwardly from the lower end of the main conduit 20 I provide a by-pass 45 which extends forwardly and is open at its end so that any cooling fluid which passes therethrough will be immediately returned to the chamber 9 before passing over the receptacle.

Figure 3:
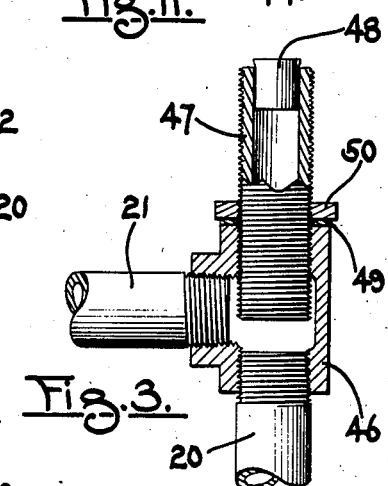
Fig. 3 is an enlarged fragmentary vertical section through one of the valve controls.

In order to be assured of the greatest efficiency the proper amount and pressure of cooling fluid passing through the spray device must be maintained. In order that this amount and pressure may be regulated I have provided a valve which is to be inserted somewhere in the main line or in the by-pass. The preferable locations for the valve are either in the outermost end of the by-pass or at the uppermost end of the main conduit. It is unlikely that the valves would be located in both places, but they have been illustrated in Fig. 2 in both locations, it being understood that one or the other may be used, or that the valve could be placed anywhere in the main line between these two limits if so desired. In Fig. 3 is shown the detailed construction of the valve located at the upper extremity of the main conduit wherein a T connection 46 is located between the main conduit 20 and the auxiliary conduit 21. The valve is in the form of a hollow pipe 47 which threadedly engages the upper end of the T 46 and has a plug 48 at its upper open end. A washer 49 and a lock nut 50 are utilized to maintain the valve in any position to which it has been adjusted. If the pressure in the main line is not sufficient to form a complete film of cooling fluid around the receptacle, the valve may be regulated so that a greater pressure will be present and thus the streams of cooling fluid being emitted from the spraying devices will have more force and a complete film can be formed.

If the valve construction is to be located at the outermost end of the by-pass, a T connection 51 similar to that shown at 46 may be secured to the by-pass. A hollow pipe 52 will threadedly engage the T connection and will have a plug 53 at its upper open end. The lock nut and washer will also be utilized to maintain the valve in any adjusted position. In the operation of the valve in this location, a back pressure will be built up to increase the force of the spray.

In the operation of this device it has been determined in actual practice that milk can be cooled by the utilization of water as a cooling fluid down to the desired temperature in a period of ten minutes or less. Such quick cooling of the milk is not only advantageous from the standpoint of the farmer but also it prevents bacterial growth by being cooled quickly. If the by-pass 45 is not used the apparatus will function satisfactorily, but by the use of such by-pass a quicker cooling is effected by reason of the fact that only a part of the water will be used to pass over the receptacle while the remainder will be returned to the refrigerating compartment and will not have been warmed in the meantime. The function of the by-pass is to maintain the water generally at a lower temperature than would otherwise be maintained if all of the water passed over the receptacle and then returned to the refrigerating compartment. In other words, the water passes over the refrigerating coils more often than it passes over the receptacle and to this end the by-pass is necessary to the cooling of the milk in such a short period of time.

Other modes of applying the principle of my invention may be used instead of the one here described, change being made as regards the structures herein disclosed provided, however, that the means stated by any of the following claims or the equivalent of such stated means be employed.

I claim:

1. A device for showering a spray of cooling fluid over and around a receptacle for cooling the substance therein comprising, a main conduit for passage of the water, two other conduits pivotally connected to said main conduit on a vertical axis, said other conduits each curved to pass partially around said receptacle and movable toward or away from each other in a substantially horizontal plane to a closed operative position or to open position to permit receptacles to be inserted or removed therefrom, and a plurality of openings in said other conduits, whereby cooling fluid under pressure passing therethrough will be sprayed over the receptacle.

2. In a device of the class described, a mechanism for showering a spray of fluid over and around a receptacle comprising, a chamber containing the fluid, a main conduit having one end immersed in said fluid and extending upwardly therefrom, a second conduit connected with the main conduit, branch conduits connected with said second conduit and extending on each side of said receptacle adjacent the upper end thereof, openings in the lower sides of said branch conduits, some of said openings being angularly disposed with respect to a vertical plane passing therethrough, and a pump for forcing the fluid through said conduits, as specified.

3. In a device of the class described, a chamber containing a cooling fluid and adapted to have a receptacle rest thereon, a conduit extending upwardly from said fluid having spray means adjacent its upper end to spray the fluid over said receptacle, a pump for forcing the fluid through said conduit, a by-pass connected with said conduit through which some of the fluid passes from the conduit and is returned to said chamber, and a valve in said by-pass to adjust the fluid pressure in said spray means.

4. In a device of the class described, a chamber containing a cooling fluid and adapted to have a receptacle rest thereon, a main conduit extending from said fluid upwardly, a second conduit extending from the main conduit having a T connection at the end thereof and adjacent the upper end of said receptacle, branch conduits extending from each side of said T for a short distance and then turned at substantially right angles thereto in a substantially horizontal plane passing one on each side of the receptacle, a pump for forcing the fluid through the conduits from said chamber, and openings in the undersides of said branch conduits, whereby the fluid will pass downwardly over the receptacle.

5. The combination of elements defined in claim 4, wherein the openings in the ends of said branch conduits are angularly disposed toward the receptacle, as specified.

6. In a device of the class described, a cabinet having an open front with a door thereon, a refrigerating compartment therein containing a cooling fluid and adapted to have a receptacle supported adjacent thereto, a main conduit extending from said compartment to the upper part of said receptacle, spray means connected with said main conduit including pivotally mounted curved conduits having openings therein and substantially surrounding said receptacle, means for forcing said cooling fluid from the refrigerating compartment through said conduits and over said receptacle, and means connecting the curved conduits with said door, whereby upon opening the door said curved conduits will separate to permit entry of the receptacle therebetween.

7. The combination of elements defined in claim 6, wherein said curved conduits are connected to said main conduit, and said last named means includes a link connecting together said curved conduits, an arm extending outwardly from one of the curved conduits, and a link connecting said arm with said door, as specified.

8. A device for spraying a cooling fluid over a receptacle including, a main conduit, branch conduits extending therefrom in a straight line at each side of the receptacle, a plurality of openings in the underside of each branch, the frontmost one of which is disposed angularly toward the receptacle, and means for forcing the fluid through said conduits, as specified.

9. A device for spraying a cooling fluid over a receptacle including, a main conduit, a forward and downward extension of said conduit terminating above the receptacle, branch conduits extending outwardly in two directions away therefrom and then downwardly, a pipe having openings in the underside thereof connected to the end of each branch at each side of the receptacle, and means for forcing the fluid through said conduits, as specified.

10. A device for spraying a cooling fluid over a receptacle including, a main conduit, two pivotally mounted conduits connected with said first conduit and curved so that together they will substantially surround the receptacle, openings in the bottom thereof, said conduits movable toward and away from each other to open and closed positions to facilitate placement of the receptacle.

11. In a device of the class described, a cabinet, a refrigerating compartment therein divided into a plurality of serially connected chambers from one side of the compartment to the other having a cooling fluid therein, refrigerating coils in all of said chambers except one at one side of the compartment, a receptacle containing a fluid to be cooled, a conduit extending from said chamber at one side of the compartment to adjacent the upper end of the receptacle, spray means for showering the cooling fluid over the receptacle, a pump adjacent said conduit for passing the cooling fluid therethrough under pressure, and a by-pass connected to said conduit and terminating adjacent one of said compartments with refrigerating coils therein, whereby the cooling fluid will pass over the coils more often than it passes over the receptacle, as specified.

JOSEPH W. CHAMBERLAIN.